United States Patent
Donald et al.

(10) Patent No.: US 6,827,850 B2
(45) Date of Patent: Dec. 7, 2004

(54) DIFFUSION BAR AEROBIC TREATMENT PLANT

(76) Inventors: Hubbard H. Donald, 2247 Hwy. 151 North, Downsville, LA (US) 71234; George E. Johnson, 2247 Hwy. 151 North, Downsville, LA (US) 71234

( * ) Notice: Subject to any disclaimer, the term of this patent is extended or adjusted under 35 U.S.C. 154(b) by 130 days.

(21) Appl. No.: 10/222,600

(22) Filed: Aug. 15, 2002

(65) Prior Publication Data

US 2003/0047500 A1 Mar. 13, 2003

Related U.S. Application Data

(60) Provisional application No. 60/312,689, filed on Aug. 15, 2001.

(51) Int. Cl.⁷ .............................. B01F 3/04; C02F 3/02
(52) U.S. Cl. ..................... 210/195.4; 261/123; 261/124
(58) Field of Search ................................ 210/605, 620, 210/621, 623, 624, 630, 195.4; 261/121.1, 123, 124

(56) References Cited

U.S. PATENT DOCUMENTS 4,863,644 A * 9/1989 Harrington et al. ........... 261/77
5,667,689 A * 9/1997 Graves ........................ 210/621

* cited by examiner

Primary Examiner—Robert A. Hopkins
(74) Attorney, Agent, or Firm—Phelps Dunbar, L.L.P.

(57) ABSTRACT

The Diffusion Bar Aerobic Treatment Plant ("DBATP") is a device which processes sewage for buildings which are not connected to municipal sewer lines. It is comprised of a pre-tank which captures trash and allows anaerobic microorganisms to begin breaking down the sewage, an aerobic tank where aerobic microorganisms digest the sewage, and a post-tank which acts as a gravity separating clarifier in which solid particulate contaminants settle downward, leaving a clean effluent for discharge to the environment. The aerobic tank encompasses a diffusion bar, which emits air bubbles that activate and stimulate the aerobic microorganisms. In the preferred embodiment, the diffusion bar is located away from the post-tank, and it emits air bubbles near the bottom of the aerobic tank and is further comprised of one or more deflector plates, which break the air bubbles from the diffusion bar into smaller micro-bubbles in order to improve oxygen entrainment and, thereby, enhance the cleaning effect of the aerobic microorganisms. The deflector plates also increase turbulence and stirring of the sewage in the aerobic tank, which further improves the cleaning function of this stage. The improved design of the diffusion bar in the DBATP markedly upgrades the performance of the aerobic sewage treatment process.

21 Claims, 5 Drawing Sheets

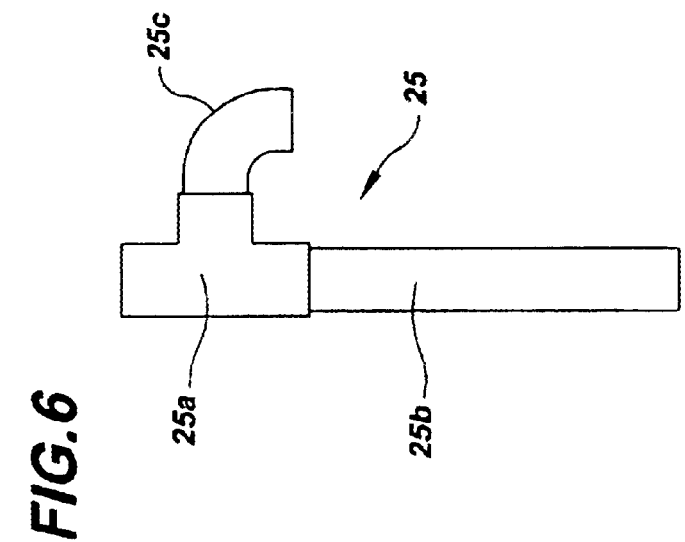
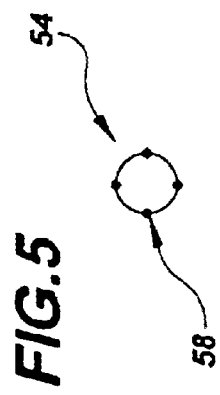
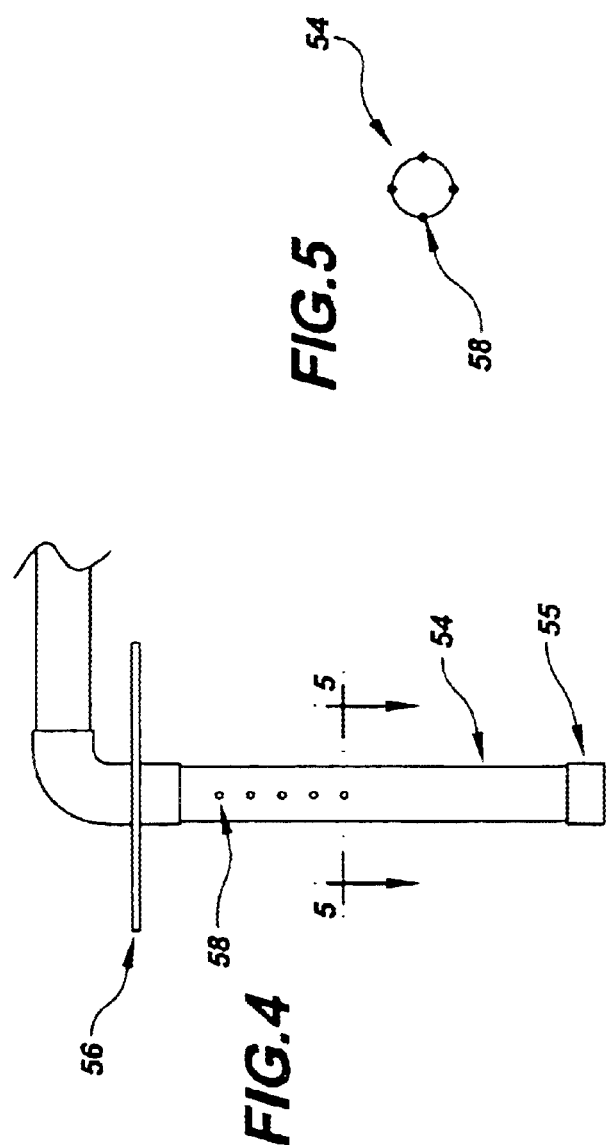
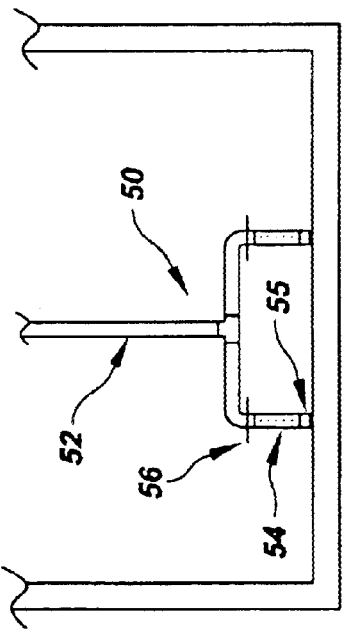

US 6,827,850 B2

DIFFUSION BAR AEROBIC TREATMENT PLANT

This application claims the benefit of U.S. Provisional Application No. 60/312,689, filing date Aug. 15, 2001.

BACKGROUND OF THE INVENTION

This invention relates generally to the treatment of sewage. More particularly, this invention relates to the treatment of sewage discharged from houses and other buildings which are not connected to a municipal sewer system such that, after the sewage has passed through the diffusion bar aerobic treatment plant ("DBATP"), it has been cleaned to a level acceptable for discharge directly into the environment so that it will not contaminate the ground water. Thus, the DBATP provides an alternative to septic systems for buildings constructed outside of a local municipal sewer system.

While there are several different existing types of conventional sewage treatment devices available for use with buildings located away from municipal sewer lines, the DBATP offers a single, simple-to-install unit comprised of three tanks, which provides a more comprehensive cleaning process than previously known in the art field. The DBATP uses a three step cleaning procedure. First, the sewage enters a pre-tank, in which trash items are trapped, gravity separation of solids from the effluent begins, and anaerobic microorganisms initially break down the sewage. Then, in the aerobic tank, air is injected into the sewage using a diffusion bar device to stimulate the growth of aerobic microorganisms, which further process the sewage, cleaning the effluent more thoroughly. The design of the diffusion bar of the present invention encourages the dispersion of smaller micro-air bubbles throughout the sewage in the aerobic tank, so that oxygen entrainment is increased in order to maximize the effectiveness of the aerobic microorganisms cleaning the sewage. Finally, the post-tank acts as a clarifier, so that the effluent is progressively cleaned by gravity separation in order to remove any solid particulate matter. Through this multi-step process, the DBATP produces a clean, environmentally-safe effluent using one, easily-installed device.

SUMMARY OF THE INVENTION

The DBATP is a device utilizing a multi-stage procedure for treating and cleaning sewage. The DBATP is typically a single unit comprised of three separate tanks: a pre-tank (also known as a trash tank), an aerobic tank (also known as a mixing chamber), and a post-tank (also known as a clarifier). The pre-tank holds the sewage for a time while allowing the anaerobic microorganisms in the sewage to begin initially breaking down the sewage. The pre-tank also acts to capture trash items and to prevent them from progressing through into the aerobic tank. Some initial gravity separation of solid particulates suspended in the sewage effluent also begins while the sewage is being held in the pre-tank. The aerobic tank houses the diffusion bar, through which air and/or oxygen is distributed into the sewage. The injection of air and/or oxygen into the aerobic tank stimulates the growth of aerobic microorganisms. The aerobic microorganisms (primarily bacteria) break down the sewage further as they digest the contaminants in the effluent, and this is the primary sewage cleaning stage of the DBATP. The post-tank acts as a clarifier or settling chamber, in which gravity separation occurs, filtering out solid particulates from the cleaned effluent, so that only cleaned effluent is discharged from the post-tank. Generally, all three tanks are joined together into a single unit, allowing for a compact device which can be conveniently installed. A compact, unitary device is useful since these types of sewage treatment devices are typically installed below ground, buried in a yard for example. Thus, a compact device requires less digging effort and less damage to the yard during installation.

The raw sewage enters the pre-tank first to allow the anaerobic microorganisms in the sewage to begin the initial processing of the sewage. The pre-tank has side walls, a top, and a bottom. Anaerobic microorganisms feed on the sewage, breaking it down in the process. The pre-tank also serves to screen out objects which would hamper the functioning of the aerobic tank. As the pre-tank continues to accept raw sewage, sewage is forced out of the pre-tank through the outlet conduit. Typically, the outlet conduit is an overflow conduit located near the top of the pre-tank which leads to the aerobic tank. Gravity will segregate the sewage in the pre-tank, such that light solids will float upon the surface while heavy solids will settle to the bottom. In between these two zones is a zone of effluent which is relatively free of particles. The overflow conduit drains sewage from this particle-free zone beneath the surface level, thereby screening out floating solids and heavy solids. An effluent filter, which is not required, may cover the opening of the overflow conduit to further prevent large particles from passing through the overflow conduit. In this way, the overflow conduit traps the large solid contaminants so that they do not enter the aerobic tank, where they might interfere with the aerobic treatment process by affecting the dispersion of oxygen throughout the sewage. The overflow conduit also reduces the chances that the DBATP will become clogged. After the raw sewage has been gravity separated and processed by anaerobic microorganisms, it flows into the aerobic tank for the next stage of the treatment process.

The aerobic tank is a vessel with sidewalls, a top, and a bottom. It encompasses a diffusion bar mechanism which is connected to an external pump/compressor so that it emits air bubbles into the sewage in the aerobic tank, aerating the sewage in order to facilitate the growth and activity of aerobic microorganisms. Aerating the sewage activates and stimulates the aerobic microorganisms in the sewage. This causes the aerobic microorganisms to multiply and increases the amount of sewage that they digest. Air bubbles emitted from the diffusion bar also act to stir the sewage in the aerobic tank, mixing the sewage so that oxygen is distributed throughout and so that there are no dead zones which could reduce the effectiveness of the aerobic process. The turbulence caused by the bubbles also prevents build-up on the walls of the aerobic tank, so that the walls are kept relatively clean. The turbulence of the air bubbles also helps to break down solid particulates within the sewage, so that the aerobic bacteria can more effectively clean the sewage.

Typically, the diffusion bar is comprised of hollow tubes. Although a variety of configurations and arrangements are possible and would produce a functional diffusion bar, the preferred embodiment utilizes a T-shaped air feed tube, which brings air from the aerator pump (compressor) outside of the tank, and two generally vertical aerator tubes, which disperse air into the sewage. The aerator tubes are conduits which each have holes drilled in them through which air can flow, and the bottom of each aerator tube is generally capped, forcing any air pumped into the diffusion bar to exit through the holes in the aerator tubes. Thus, air will bubble out of the diffusion bar into the sewage in the aerobic tank. In the preferred embodiment, the diffusion bar also includes two deflector plates, one located near the top of each aerator tube, above the holes. As air exits the holes in the aerator tubes of the diffusion bar, it bubbles quickly upward in a nearly vertical line near the aerator tube from which it exited. These air bubbles will smash into the deflector plates located above the holes, bursting into smaller bubbles which will increase the amount of oxygen entrainment in the aerobic tank.

The deflector plates are designed to break down the bubbles emitted from the holes in the aerator tubes, producing smaller bubbles. Smaller bubbles and increased oxygen entrainment help to increase the efficiency of the aerobic bacteria (since there is more air bubble surface space upon which the bacteria may act), such that the aerobic cleaning process produces better results. The deflector plates also act to disperse the bubbles outward away from the diffusion bar, so that oxygenation is better accomplished, and to increase the turbulence within the sewage in the aerobic tank, improving the mixing effect. This ensures better aeration of the sewage throughout the aerobic tank, and a more uniform cleaning process. In all of these ways, the deflector plates on the diffusion bar improve the operation of the aerobic tank, producing a cleaner effluent.

Although the diffusion bar in the preferred embodiment is Y-shaped, with two vertical aerator tubes attached to the ends of a T-shaped air feed tube, this shape is not necessary. The critical feature of the diffusion bar is simply that it disperses air through holes located near the bottom of the aerobic tank. Furthermore, the location of the diffusion bar, away from the separator wall between the aerobic tank and the post-tank (and in the preferred embodiment, adjacent to the wall between the aerobic tank and the pre-tank), is important to direct the sewage towards the post-tank (which acts as a clarifier), to oxygenate the sewage as it is introduced into the aerobic tank (for maximum aerobic processing time), and to cause maximum turbulence within the sewage as it initially enters the aerobic tank, with the sewage becoming more calm as it approaches the post-tank (thereby encouraging settling and gravity segregation in the post-tank). When deflector plates are used to improve the efficiency of the diffusion bar, the critical factor is the location of the deflector plates with regard to the holes in the diffusion bar: a deflector plate should be located a slight distance above the holes in the diffusion bar so that the rising air bubbles will collide with the deflector plate.

The post-tank is a vessel with sidewalls, a top, and a bottom. The sidewall between the aerobic tank and the post-tank, however, does not completely separate the two tanks. Rather, there is a gap (which is several inches high and which typically spans the entire width of the tanks) along the bottom of the tanks, so that effluent can flow from the aerobic tank into the post-tank underneath this separator wall. Thus, the wall between the aerobic tank and the post-tank hangs down but does not touch the bottom of the tanks, and acts more as a separating baffle than as a structural support element. By design, the post-tank acts as a clarifier. The bottom of the post-tank slopes upward as it move away from the aerobic tank. Located near the top of the post-tank is an outlet, where the cleaned effluent is discharged to ground. The post-tank is a zone of relative calm, since the separator wall shields the post-tank from the turbulence of the aerobic tank. As the sewage is pushed into the post-tank and up the sloped bottom, gravity separation occurs, with heavy particulates falling out of the effluent as it rises up in the post-tank. As the effluent progresses up through the post-tank, contaminants in the effluent are continuously acted upon by gravity, and will settle towards the bottom of the post-tank. In this way, the post-tank acts as an effluent clarifier, screening out solid contaminants so that the effluent at the top of the post-tank, which is discharged to ground through the outlet, is clean and relatively free of solid particulates.

It is an object of this invention to clean sewage in preparation for discharge. In doing so, this invention captures trash in the pre-tank, uses both aerobic and anaerobic microorganisms to break down the sewage, and utilizes gravity separation to clarify the effluent for discharge. It is still another object of this invention for it to be easy to install, durable, and to require little maintenance. It is yet another object of this invention to provide for a multi-stage cleaning process using three tanks in a single, compact unit. It is yet another object of this invention to discharge water which meets or exceeds state water quality requirements. It is yet another object of this invention to increase the effectiveness of the aerobic treatment of sewage by utilizing a diffusion bar design which increases aeration and oxygen entrainment. It is yet another object of this invention to improve aeration throughout an aerobic tank by utilizing a diffusion bar design and placement which encourages turbulent mixing and dispersion of air bubbles more uniformly throughout the sewage. These and other objects will be apparent to those skilled in the art field.

BRIEF DESCRIPTION OF DRAWINGS

Reference will be made to the drawings where like parts are designated by like numerals and wherein:

FIG. 3 is a side view of the preferred embodiment of the diffusion bar 50 within the aerobic tank 40 in the preferred embodiment of the DBATP;

FIG. 4 is an partial view of the aerator conduit 54 section of the diffusion bar 50 in the preferred embodiment of the DBATP;

FIG. 5 is an overhead-plan view of the aerator conduit 54 of the diffusion bar 50 in the preferred embodiment of the DBATP, showing the preferred location of the holes 58 around the circumference of the aerator conduit 54; and FIG. 6 is a side view of the overflow conduit 25 in the preferred embodiment of the DBATP.

DETAILED DESCRIPTION OF PREFERRED EMBODIMENT

Figure 1:
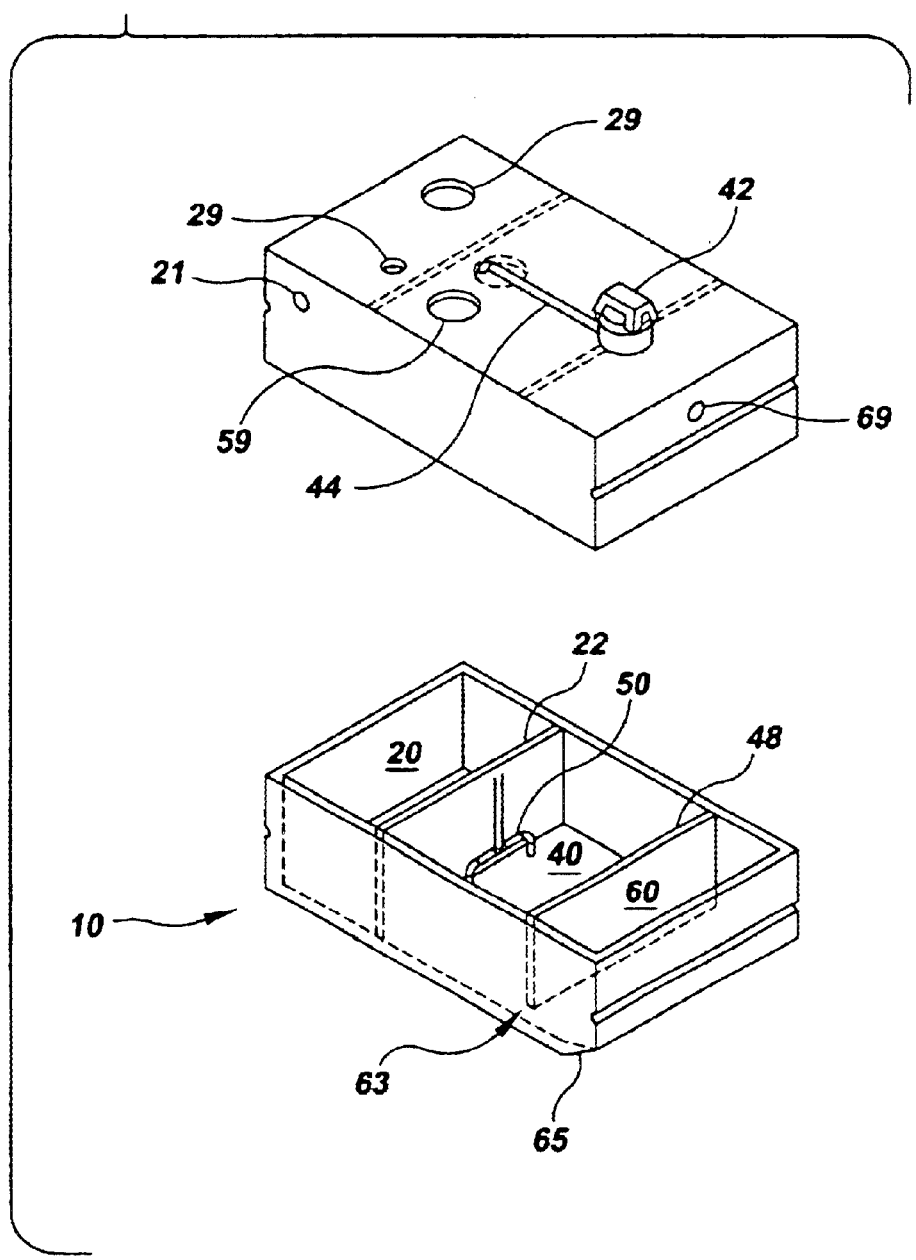
FIG. 1 is an isometric drawing of the top and bottom pieces of the preferred embodiment of the DBATP.
Figure 2:
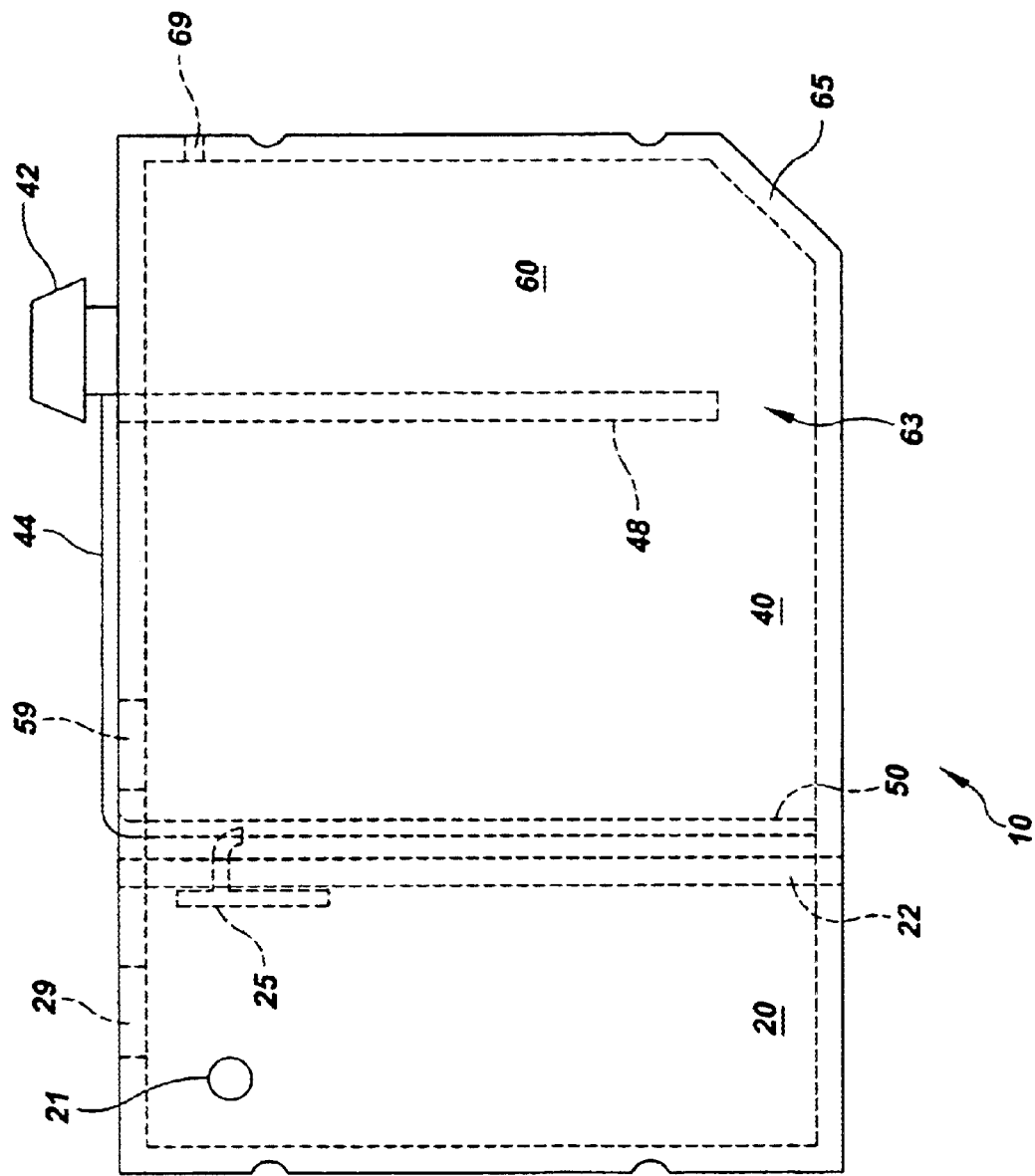
FIG. 2 is a side view-hidden line drawing of the preferred embodiment of the DBATP.

Referring now to the drawings in more detail, the preferred embodiment of the DBATP is shown in FIGS. 1 and 2 and is generally designated by the numeral 10.

The DBATP 10 of the preferred embodiment is comprised of three covered tanks which are rigidly joined together into a single unit. The central tank, which is generally the largest, is the aerobic tank 40. Although shape is not a driving factor, the preferred embodiment of the DBATP 10 utilizes a rectangular aerobic tank 40, with a rectangular pre-tank 20 rigidly attached on one side and a rectangular post-tank 60 rigidly attached on the other side. In the preferred embodiment, the pre-tank 20 is a completely separate tank, isolated from the aerobic tank by a dividing wall 22 which spans the entire length and height of the pre-tank 20 and the aerobic tank 40, while the post-tank 60 is not completely separated from the aerobic tank 40, but allows some communication of sewage from the aerobic tank 40 to the post-tank 60 since the post-tank 60 is divided from the aerobic tank 40 by a partial separator wall 48 which hangs down from the top of the DBATP 10 but which leaves a gap 63 at the bottom with clearance between the aerobic tank 40 and the post-tank 60. Also, the floor 65 of the post-tank 60 is sloped so that it angles upward as it extends out away from the aerobic tank 40 in the preferred embodiment. While other configurations are available for the DBATP 10, as a person skilled in the art field will understand and appreciate, the preferred embodiment utilizes the configuration set forth above since it provides for a simple, unitary device which effectively performs the multi-stage sewage cleaning process using the diffusion bar 50 of the present invention, while also being easy to manufacture and simple to install.

The pre-tank 20 has an inlet port 21 in one of its exterior sidewalls where the sewage can flow into the DBATP 10. Generally, the inlet port 21 is located near the top of the pre-tank 20 away from the connection to the aerobic tank 40. Located near the top of the pre-tank 20 on the wall of the pre-tank 20 adjacent to the aerobic tank 40 (i.e. the dividing wall 22) is an overflow conduit 25 which penetrates the dividing wall 22 between the pre-tank 20 and the aerobic tank 40 and allows for sewage to flow from the pre-tank 20 into the aerobic tank 40. The purpose of the overflow conduit 25 is to transport sewage, which has been in the pre-tank 20 for a sufficient duration of time to allow the anaerobic microorganisms to begin processing the sewage, from the pre-tank 20 to the aerobic tank 40 for further processing. The overflow conduit 25 draws effluent from beneath the surface, in the relatively particle-free zone of effluent between the surface, where light particles float, and the bottom, where the heavy particles settle. An effluent filter can cover the overflow conduit 25 to further reduce the amount of solid contaminants entering the aerobic tank. In the preferred embodiment, the overflow conduit 25 is comprised of a T-joint 25a, a length of straight conduit 25b, and a directional bend 25c (see FIG. 6). One branch of the T-joint 25a passes through the common dividing wall 22 of the pre-tank 20 and the aerobic tank 40. The remaining branches of the T-joint 25a project up towards the top of the pre-tank 20 and down towards the bottom of the pre-tank 20. The upper branch of the T-joint 25a is open and extends above the sewage surface level to act as a vent. The straight conduit 25b is rigidly attached to the bottom branch of the T-joint 25a. The straight conduit 25b extends down a short distance beneath the sewage fluid level in the pre-tank 20 so that it takes sewage from near the surface but not from the surface of the sewage itself, where there may be material floating. On the other side of the common dividing wall 22 between the pre-tank 20 and the aerobic tank 40, the directional bend 25c of the overflow conduit 25 is rigidly attached to the T-section 25a so that it directs the sewage flow downward into the aerobic tank 40. The pre-tank 20 also typically has one or more hatches 29 in its top, which allows for maintenance and cleaning of the pre-tank 20.

Within the aerobic tank 40 is a diffusion bar 50, which is the essential element in the aerobic sewage cleaning stage. The diffusion bar 50 is connected to an external pump/compressor located above ground so that air is driven through the diffusion bar and is emitted as bubbles in the sewage in the aerobic tank, aerating the sewage in order to facilitate the aerobic sewage cleaning process. The aerobic tank 40 is separated from the post-tank 60 by a separator wall 48. In the preferred embodiment, the separator wall 48 does not completely divide the post-tank 60 from the aerobic tank 40; rather, the separator wall 48 acts as a baffle, hanging down from the top of the tanks but leaving a gap 63 between the bottom of the separator wall 48 and the bottom of the tanks so that sewage can flow under the separator wall 48 from the aerobic tank 40 into the post-tank 60. In this way, the separator wall 48 shields the post-tank 60 from the turbulence in the aerobic tank 40, while allowing sewage flow between the tanks. Typically, an inspection port 59 is located in the top of the aerobic tank 40, allowing for maintenance and cleaning of the aerobic tank 40. In the preferred embodiment, an integrated aerator unit 42 for pumping air to the diffusion bar 50 is located atop the DBATP 10, rather than utilizing a separate external pump/compressor. The aerator 42 is a riser which is designed to project up above ground level when the DBATP 10 is installed so that the integrated air pump/compressor can effectively intake air for distribution within the aerobic tank 40. The aerator 42 is connected to the diffusion bar 50 by an airline 44 if necessary (depending upon placement of the aerator 42 with respect to the location of the diffusion bar 50).

The diffusion bar 50 is comprised of one or more conduits, typically hollow tubes, with at least one of these tubes being perforated so that air in the diffusion bar 50 can exit into the aerobic tank 40. In the preferred embodiment, the diffusion bar 50 is constructed of ¾ of an inch schedule 40 PVC tubing. Although a person skilled in the art field will understand and appreciate that a variety of configurations and arrangements are possible and would produce a functional diffusion bar 50, the preferred embodiment utilizes an inverted T-shaped air feed conduit 52, which connects to the airline 44 and thereby to the aerator 42, and two generally vertical aerator conduits 54, which disperse air into the sewage (see FIG. 3). In the preferred embodiment, the two vertical aerator conduits 54 are spaced approximately 20 inches apart and are approximately 10 inches long. The aerator conduits 54 are typically hollow tubes which are capped at their ends, and each of the aerator conduits 54 have a series of holes 58 drilled in them through which air can exit the aerator conduits 54 into the sewage in the aerobic tank 40 (see FIG. 4). It should be noted that while a cap 55 typically acts to completely impede air flow out the bottom of an aerator conduit 54, a cap 55 may also serve its function by only substantially impeding air flow out the bottom end of an aerator conduit 54, thereby forcing the majority of air to flow out the holes 58 in the aerator conduit 54.

The diffusion bar 50 generally has its holes 58 located slightly above the bottom of the aerobic tank 40 in order to facilitate a shallow sludge blanket on the bottom of the aerobic tank 40. In the preferred embodiment, each aerator conduit 54 of the diffusion bar 50 rests upon the bottom of the aerobic tank 40, in order to provide structural support for the weight of the diffusion bar 50, and has a series of five vertical sets of four holes 58 located in horizontal rows evenly around the circumference of each aerator conduit 54 (see FIG. 5). While the size of the holes 58 can vary depending upon the specific design criteria, preferably the holes 58 will be as small as possible while not clogging regularly, since this produces smaller bubbles and thereby improves oxygen entrainment. In the preferred embodiment, each hole 58 in the aerator conduit 54 is approximately 3/32 of an inch in diameter, and each vertical set of holes 58 is spaced ½ inch apart. The holes are typically located a few inches off of the bottom of the aerobic tank so that there is a narrow quiescent zone beneath them where solid particulates may fall and accumulate as sludge. In the preferred embodiment, the lowest hole 58 in each of the aerator conduits 54 is located approximately 5 inches above the bottom of the aerobic tank 40. While other dimensions will function, the preferred dimensions provide for a sufficiently thick sludge layer on the bottom of the aerobic tank so that the interval between cleanings will be reasonable, while providing for a sufficiently shallow sludge layer so that the clearance gap 63 between the aerobic tank 40 and the post-tank 60 will not be blocked. This sludge must be regularly emptied at sufficient intervals so that it does not prevent sewage flow between the aerobic tank 40 and the post-tank 60.

In the preferred embodiment, the diffusion bar 50 also includes deflector plates 56, located near the top of each aerator conduit 54 above the uppermost hole 58. In the preferred embodiment, these deflector plates 56 are flat discs with a diameter of approximately 4 and ¾ inches which are centered around each of the aerator conduits 54, and in the preferred embodiment, the deflector plates 56 are located less than approximately 2 inches above the uppermost row of holes 58 in the aerator conduit 54. As air exits the holes 58 in the aerator conduits 54 of the diffusion bar 50, it bubbles quickly upward in a nearly vertical line near the aerator conduit 54 from which it exited. These air bubbles will smash into the deflector plate 56 located above the holes 58, bursting into smaller micro-bubbles which will increase the amount of oxygen entrainment in the aerobic tank 40. The deflector plates 56 are designed to break down the bubbles emitted from the holes 58 in the aerator conduits 54, producing smaller micro-bubbles. Smaller bubbles and increased oxygen entrainment help to increase the efficiency of the aerobic bacteria (since there is more air bubble surface space upon which the bacteria may act), such that the aerobic cleaning process produces better results. The deflector plates 56 also act to disperse the bubbles outward away from the diffusion bar 60, so that oxygenation is better accomplished, and to increase the turbulence within the sewage in the aerobic tank 40, improving the mixing effect. This ensures better aeration of the sewage throughout the aerobic tank 40, and a more uniform cleaning process. In all of these ways, the deflector plates 56 on the diffusion bar 50 improve the operation of the aerobic tank 40, producing a cleaner effluent.

Although the diffusion bar 50 in the preferred embodiment is Y-shaped, with two vertical aerator conduits 54 attached to the ends of an inverted T-shaped air feed conduit 52, this shape is not required. For example, a single long vertical aerator conduit 54 with holes 58 on its lower portion could be used; a horizontal linear aerator conduit 54 attached to a vertical linear air feed conduit 52 could be used; or a circular horizontal aerator conduit 54 hanging from an air feed conduit 52 could be used. Also, deflector plates 56 could be used with any of these configurations. The critical feature of the diffusion bar 50 is simply that it disperses air through holes 58 located near the bottom of the aerobic tank 40 (although preferably, the holes 58 are located slightly above the bottom of the aerobic tank 40 to facilitate a shallow sludge layer). Typically, the diffusion bar 50 is located away from the separator wall 48 between the aerobic tank 40 and the post-tank 60, to ensure that there is a flow of sewage from the aerobic tank 40 into the post-tank 60. In the preferred embodiment, the diffusion bar 50 is located in proximity to (adjacent to) the dividing wall 22 between the aerobic tank 40 and the pre-tank 20, since this will direct the sewage flowing into the aerobic tank 40 from the pre-tank 20 through the overflow conduit 25 towards the post-tank 60. This preferred location for the diffusion bar 50 is also beneficial because it oxygenates the sewage as it is introduced into the aerobic tank 40 (for maximum aerobic processing time) and causes maximum turbulence within the sewage as it initially enters the aerobic tank 40 (to provide effective oxygen dispersion throughout the sewage), with the sewage becoming more calm as it approaches the post-tank 60 (thereby encouraging settling and gravity segregation in the post-tank 60).

When deflector plates 56 are used to improve the efficiency of the diffusion bar 50, the critical factor is the location of the deflector plates 56 with regard to the holes 58 in the diffusion bar 50: a deflector plate 56 should be located a slight distance above the holes 58 in the diffusion bar 50 so that the rising air bubbles will collide with the deflector plate 56. In the preferred embodiment, the deflector plates 56 are located approximately two to three inches above the uppermost hole 58 in each aerator conduit 54. Also, in the preferred embodiment when the diffusion bar 50 is located near the separator wall 22, the deflector plates 56 approach or contact the separator wall 22 between the aerobic tank 40 and the pre-tank 20, as this increases the turbulence and enhances the effect of the deflector plates 50. This allows the sewage to undergo primary oxygenation and maximum turbulence as it first enters the aerobic tank 40. The air bubbles from the diffusion bar 50 also direct the sewage across the aerobic tan 40 towards the post-tank 60. The sewage in the aerobic tank 40 becomes more calm as it moves away from the turbulence caused by the diffusion bar 50, allowing settling and gravity separation to begin in preparation for the clarifying stage in the post-tank 60. As settling begins to occur in this calmer region of the aerobic tank 40, heavier solid particulates fall towards the bottom of the aerobic tank 40 and collect on the floor of the tank, forming a sludge layer.

The post-tank 60 is partitioned off from the turbulence of the aerobic tank 40 by a separator wall 48. The separator wall 48 does not completely isolate the post-tank 60 from the aerobic tank 40 in the preferred embodiment. Rather, there is a gap 63 (which in the preferred embodiment is several inches high and spans the entire width of the tanks) along the bottom of the tanks, so that sewage effluent can flow from the aerobic tank 40 into the post-tank 60 underneath the separator wall 48. Thus, the separator wall 48 between the aerobic tank 40 and the post-tank 60 hangs down but does not touch the bottom of the tanks, and acts more as a separating baffle than as a structural support element. By design, the post-tank 60 acts as a clarifier. In the preferred embodiment this clarifying function is encouraged by having at least a portion of the bottom 65 of the post-tank 60 slope upward as it extends out away from the aerobic tank 40. Located near the top of the post-tank 60 is an outlet 69, where the cleaned effluent is discharged to ground. In the preferred embodiment, this outlet conduit 69 is design in the same fashion as the overflow conduit 25, such that it draws effluent from beneath the surface level within the post-tank 60 so that any floating contaminants which have made their way through the entire cleaning process will not be discharged into the environment. Again, a port may be located in the top of the post-tank to allow for maintenance and cleaning. In the preferred embodiment, the aerator riser 42 is instead located over the post-tank so that it may serve this function.

The invention described above employs a three stage procedure for cleaning raw sewage. The raw sewage enters the DBATP 10 pre-tank 20 through the inlet port 21, which has a sealant coupling or gasket around it to prevent any leakage in the preferred embodiment. The sewage is held in the pre-tank 20, allowing anaerobic microorganisms to begin breaking down the sewage. The size of the pre-tank 20 is selected taking into account the typical amount of sewage which will be generated so that the anaerobic microorganisms will have sufficient time to process the sewage. As more sewage enters the pre-tank 20 through the inlet port 21, the treated sewage is displaced upwards in the pre-tank 20. Some of this rising sewage enters the overflow conduit 25. By design, the overflow conduit 25 takes sewage from beneath the sewage surface level, thereby eliminating any contaminants which float upon the surface. In addition, an effluent filter may cover the opening of the overflow conduit 25 to prevent smaller solid contaminants from passing into the aerobic tank 40. In this way, the pre-tank captures large solid contaminants before they can enter the aerobic tank 40, where they could interfere with the sewage treatment process.

The sewage flows through the overflow conduit 25 into the aerobic tank 40. A sealant around the area in which the overflow conduit 25 passes through the sidewall 22 of the pre-treatment tank 20 prevents any leakage between tanks. As more sewage enters the aerobic tank 40 through the overflow conduit 25, sewage is displaced downward and across in the aerobic tank 40. The sewage passes through the air bubbles emitted from the diffusion bar 50. The diffusion bar 50 aerates the sewage and causes turbulence which breaks down the solid particles suspended in the effluent. Air bubbles emitted from the diffusion bar 50 also act to stir the sewage in the aerobic tank 40, mixing the sewage so that oxygen is distributed throughout and so that there are no dead zones which could reduce the effectiveness of the aerobic process. The turbulence also prevents build-up on the walls of the aerobic tank 40, so that the walls are kept relatively clean. The turbulence of the air bubbles also helps to break down solid particulates within the sewage, so that the aerobic bacteria can more effectively clean the sewage. Finally, the turbulence of the air bubbles also tends to drive the sewage towards the post-tank 60. In the aerobic tank 40, aerobic microorganisms in the sewage further clean the sewage, reproducing exponentially as the sewage is aerated and efficiently digesting the sewage to break down the sewage into a cleaner effluent. The effect of the deflector plates 56 on the diffusion bar 50 actually causes an upward, rotational flow of sewage in the aerobic tank 40, which further enhances the aerobic cleaning stage by sucking particulates out of the clarifier and by reintroducing particulates from the sludge layer into suspension in the effluent in the aerobic tank 40 for additional aerobic processing. Thus, the deflector plates 56 on the diffusion bar 50 allow the aerobic microorganisms in the aerobic tank 40 to further break down contaminants in the sewage. As the sewage moves away from the diffusion bar 50, there is less turbulence, and gravity separation begins to take place, with solid particulate contaminates suspended in the effluent beginning to settle towards the floor of the aerobic tank 40 and accumulating as sludge.

The sewage eventually progresses through the gap 63 between the aerobic tank 40 and the post-tank 60, under the separator wall 48, to enter the post-tank 60. The post-tank 60 is a zone of relative calm, since the separator wall 48 shields the post-tank 60 from the turbulence of the aerobic tank 40. As the sewage is pushed into the post-tank 60 and up the sloped bottom 65, gravity separation occurs, with heavy particulate contaminates continually settling out of the effluent as it rises up in the post-tank 60. As the effluent progresses up through the post-tank 60, contaminants in the effluent are continuously acted upon by gravity, and will settle towards the bottom of the post-tank 60. In this way, the post-tank 60 acts as an effluent clarifier, screening out solid contaminants so that the effluent at the top of the post-tank 60, which is discharged to ground through the outlet 69, is clean and relatively free of solid particulates. Again, the size of the pre-tank 20, the aerobic tank 40, and the post-tank 60 are selected based upon the typical amounts of sewage to be processed, so that each chamber has sufficient time to perform its cleaning function.

Figure 8:
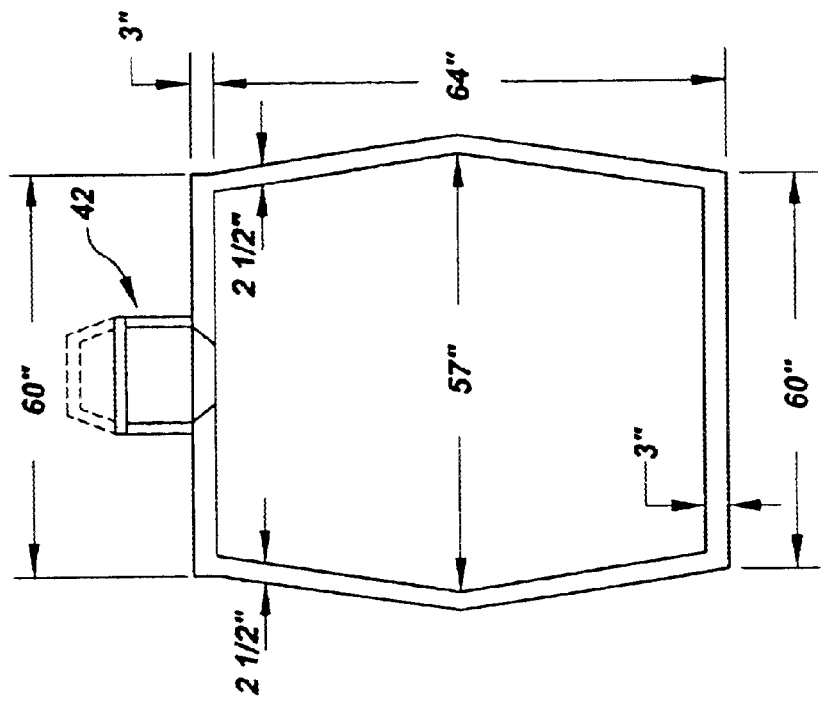
FIG. 8 is a front view of an alternative version of the DBATP, illustrating a two-piece tank design.
Figure 7:
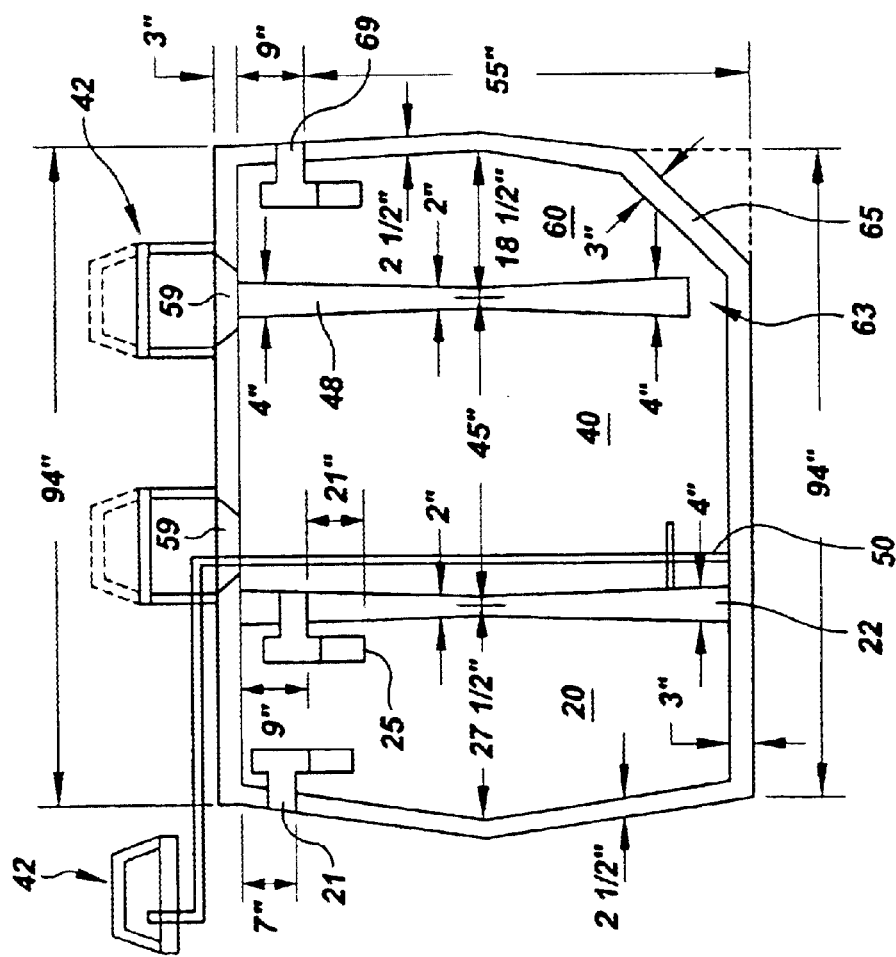
FIG. 7 is a cut-away side view of an alternative version of the DBATP, illustrating a two-piece tank design.
Figure 10:
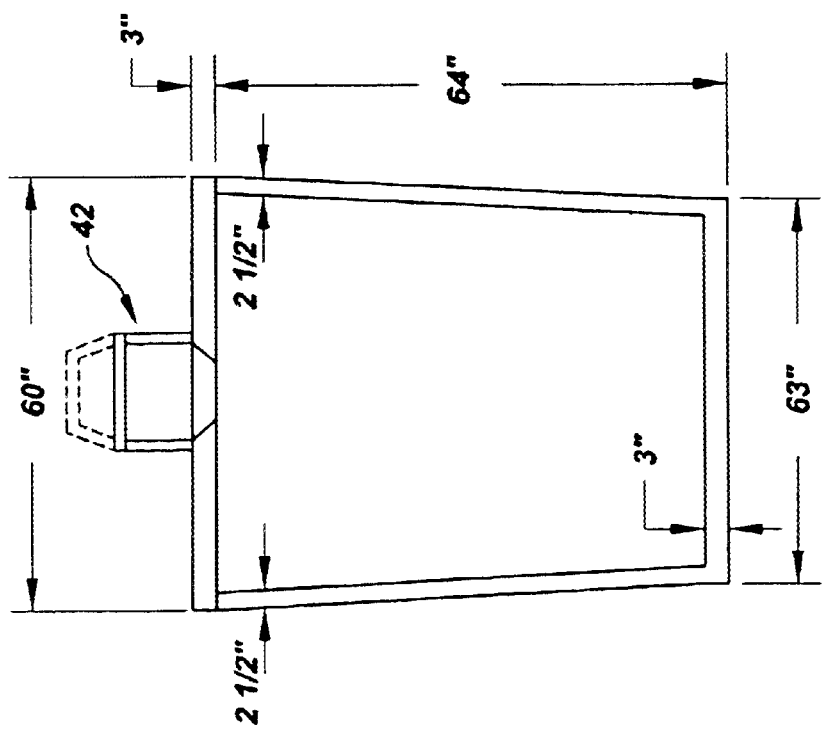
FIG. 10 is a front view of an alternative version of the DBATP, illustrating a one-piece tank design.
Figure 9:
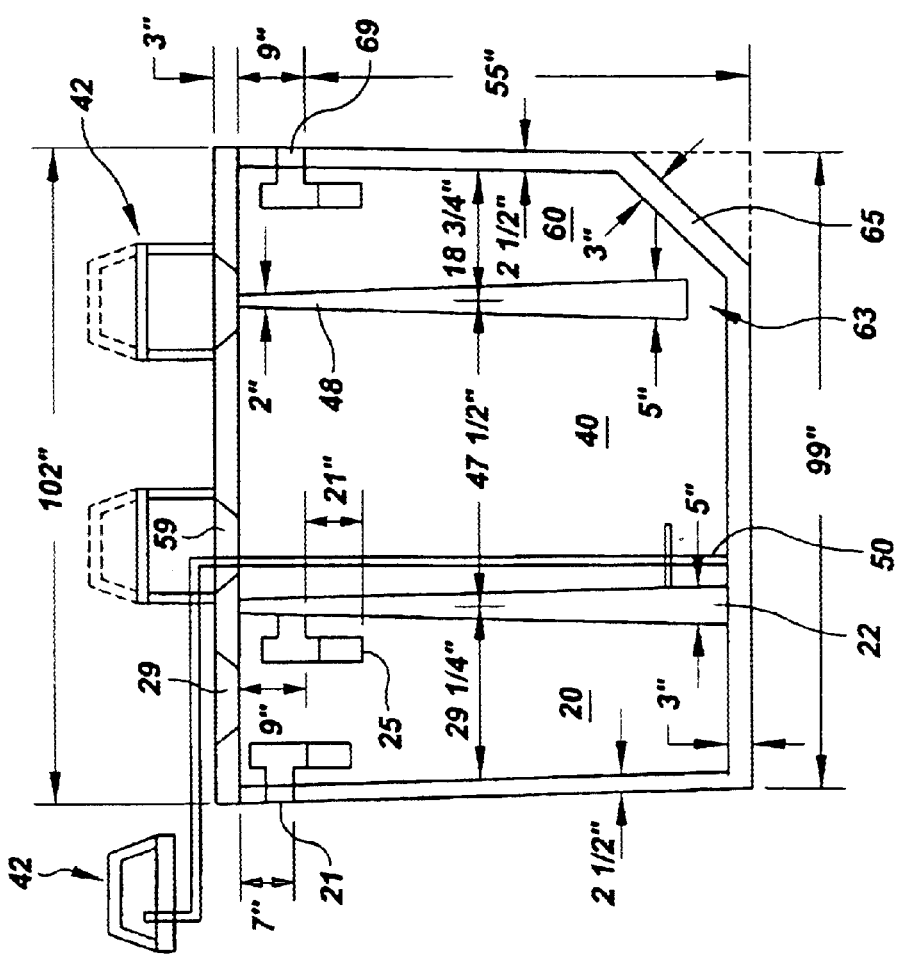
FIG. 9 is a cut-away side view of an alternative version of the DBATP, illustrating a one-piece tank design.

In the preferred embodiment, the three tanks are rectangular in cross-section and are joined together into a single unit for ease of installation. While the DBATP 10 could be effectively made using tanks of various sizes, depending upon the specific needs of the project, in the preferred embodiment, the pre-tank 20 is typically 325–400 gallons, the aerobic tank 40 is typically 533–560 gallons, and the post-tank 60 is typically 181–188 gallons. In the preferred embodiment, the overall dimensions of the DBATP 10 are approximately 96 inches long, 62 inches deep, and 61 inches high Although the tanks may be made of any durable, non-porous, solid material, in the preferred embodiment, they are made of wire mesh reinforced concrete, with the tank walls approximately 2 and ½ inches thick. And although the unit comprising the three tanks could be constructed as a single piece, in the preferred embodiment, the DBATP 10 is comprised of two pieces, a top and a bottom, joined together. This simplifies both manufacture and installation. Typically, the top and bottom pieces are joined with a mechanical coupling (for example, a male/female joint built into the walls), and the joint is sealed with a butal rubber sealant to make the joint secure and watertight. FIGS. 7 and 8 illustrate such a DBATP 10 with two piece construction using male and female-joints to link the top and bottom pieces together. FIGS. 9 and 10 illustrate an alternative version of the DBATP 10, constructed as a single unit. The preferred embodiment also includes grooves along the sides of both the top and bottom pieces of each unit, which provide a convenient location for a lifting device, such as a lifting bar or sling, to grasp the unit in order to further simplify installation.

What we claim is:

1. A diffusion bar comprising:
   a first aerator conduit;
   a second aerator conduit;
   an air feed conduit;
   a first deflector elate; and
   a second deflector plate;
   wherein said first aerator conduit is perforated with one or more holes, and said first deflector plate is located in relation to said first aerator conduit so that said first deflector plate is above said holes of said first aerator conduit,
   wherein said second aerator conduit is perforated with one or more holes, and said second deflector plate is located in relation to said second aerator conduit so that said second deflector plate is above said holes of said second aerator conduit; and
   wherein said air feed conduit is an inverted T-shaped conduit, said two aerator conduits are oriented vertically, and said bottom end of each of said aerator conduits is capped and said upper end of each of said aerator conduits is attached to said air feed conduit.

2. A diffusion bar as in claim 1 wherein each of said aerator conduits are perforated by a plurality of holes, wherein said plurality of holes are located around the circumference of each of said aerator conduits and extend vertically along some portion of the length of each of said aerator conduits.

3. A diffusion bar as in claim 2 wherein each of said deflector plates is a circular disc.

4. A diffusion bar as in claim 3 wherein one of said deflector plates is centered around each of said aerator conduits at a location above the uppermost of said plurality of holes in each of said aerator conduits.

5. A diffusion bar as in claim 4 wherein each of said aerator conduits is further comprised of 20 holes, wherein said holes are located on each of said aerator conduits such that 4 holes are evenly spaced in a horizontal row around the circumference of each of said aerator conduits and a series of five rows of holes are located vertically along the length of each of said aerator conduits and are spaced approximately ½ of an inch apart vertically, with the lowest row of holes being located approximately five inches above the capped end of each of said aerator conduits;

wherein said holes are approximately 3/32 of an inch in diameter;

wherein said deflector plate has a diameter of approximately 4 and ¾ inches; and wherein said deflector plate is located approximately two to three inches above the uppermost row of holes for each of said aerator conduits.

6. A sewage treatment plant comprising:

a pre-tank;

an aerobic tank; and a post-tank;

wherein said pre-tank, said aerobic tank, and said post-tank are rigidly joined and connected in series so that sewage flows from said pre-tank, into said aerobic tank, and then into said post-tank;

wherein said pre-tank and said aerobic tank share a dividing wall;

wherein said aerobic tank and said post-tank share a separator wall which divides said aerobic tank from said post-tank, but which leaves a gap at the bottom, allowing sewage flow between said aerobic tank and said post-tank;

wherein said aerobic tank further comprises a diffusion bar;

wherein said diffusion bar further comprises one or more deflector plates;

wherein said diffusion bar further comprises one or more aerator conduits; and wherein each of said aerator conduits further comprises a plurality of holes, and wherein one of said deflector plates is located above said plurality of holes for each of said one or more aerator conduits.

7. A sewage treatment device as in claim 6 wherein said diffusion bar is located adjacent to said dividing wall between said aerobic tank and said pre-tank.

8. A sewage treatment device as in claim 6 further comprising an aerator and an overflow conduit;

wherein said post-tank further comprises a sloped bottom angled upwards as it extends away from said separator wall and said aerobic tank; and wherein said aerator pumps air into said diffusion bar.

9. A sewage treatment device as in claim 8 wherein said diffusion bar further comprises an air feed conduit.

10. A sewage treatment device as in claim 9 wherein said one or more aerator conduits are oriented vertically and wherein the bottom end of said one or more aerator conduits are capped and the upper end of said one or more aerator conduits are attached to said air feed conduit.

11. A sewage treatment device as in claim 10:

wherein one of said deflector plates is attached to each of said aerator conduits at a location above the uppermost of said plurality of holes in said aerator conduit; and wherein said plurality of holes are located around the circumference of said aerator conduit and extend vertically along some portion of the length of said aerator conduits.

12. A sewage treatment device as in claim 11 wherein said diffusion bar is located adjacent to the dividing wall between said aerobic tank and said pre-tank.

13. A sewage treatment device as in claim 12 wherein each of said aerator conduits is further comprised of 20 holes, wherein said holes are located on each of said aerator conduits such that 4 holes are evenly spaced in a horizontal row around the circumference of each of said aerator conduits and a series of five rows of holes are located vertically along the length of each of said aerator conduits and are spaced approximately ½ of an inch apart vertically, with the lowest row of holes being located approximately five inches above the capped end of each of said aerator conduits;

wherein said holes are approximately 3/32 of an inch in diameter;

wherein each of said deflector plates is a circular disc with a diameter of approximately 4 and ¾ inches; and wherein each of said deflector plates is located approximately two inches above the uppermost row of holes for each of said aerator conduits and is centered about one of said aerator conduits.

14. A sewage treatment plant as in claim 12 wherein said overflow conduit draws sewage from beneath the surface level within said pre-tank for transport into said aerobic tank;

and wherein said aerator is rigidly attached atop one of said tanks as a riser, so that it projects above ground level when said sewage treatment plant is installed in the ground.

15. A sewage treatment device comprising:

a pre-tank;

an aerobic tank; and a post-tank;

wherein said pre-tank, said aerobic tank, and said post-tank are connected in series so that sewage flows from said pre-tank, into said aerobic tank, and then into said post-tank;

wherein said aerobic tank and said post-tank share a separator wall which divides said aerobic tank from said post-tank, but which leaves a gap at the bottom, allowing sewage flow between said aerobic tank and said post-tank;

wherein said aerobic tank further comprises a diffusion bar;

wherein said diffusion bar further comprises an aerator conduit and a deflector plate; and wherein said aerator conduit is perforated with one or more holes, and said deflector plate is located in relation to said aerator conduit so that said deflector plate is above said holes of said aerator conduit.

16. A sewage treatment plant as in claim 15 further comprising an air feed conduit, a second aerator conduit, and a second deflector plate;

wherein said second aerator conduit is perforated with one or more holes, and said second deflector plate is located in relation to said second aerator conduit so that said second deflector plate is above said holes of said second aerator conduit;

wherein said air feed conduit is an inverted T-shaped conduit, said two aerator conduits are oriented vertically, and said bottom end of each of said aerator conduits is capped and said upper end of each of said aerator conduits is attached to said air feed conduit.

17. A sewage treatment plant as in claim 16 wherein each of said aerator conduits are perforated by a plurality of holes;

wherein said plurality of holes are located around the circumference of each of said aerator conduits and extend vertically along some portion of the length of each of said aerator conduits; and wherein one of said deflector plates is attached to each of said aerator conduits at a location above the uppermost of said plurality of holes in said aerator conduit.

18. A sewage treatment plant as in claim 17 wherein said diffusion bar is located away from the separator wall between said aerobic tank and said post-tank.

19. A sewage treatment plant as in claim 17 further comprising an overflow conduit through which sewage flows from said pre-tank into said aerobic tank; wherein said diffusion bar is located adjacent to the sidewall of said aerobic tank where sewage enters from said pre-tank through said overflow conduit.

20. A sewage treatment plant as in claim 19 wherein said post-tank further comprises a sloped bottom angled upward as it extends away from said separator wail and said aerobic tank.

21. A sewage treatment plant as in claim 19 wherein said diffusion bar rests upon the bottom of said aerobic tank, such that the capped ends of said aerator conduits support said diffusion bar.

* * * * *